(12) United States Patent
Mulligan et al.

(10) Patent No.: US 9,397,924 B2
(45) Date of Patent: *Jul. 19, 2016

(54) METHOD FOR APPLYING MACRO-CONTROLS ONTO IP NETWORKS USING INTELLIGENT ROUTE INDEXING

(71) Applicant: AT&T Intellectual Property I, L.P., Atlanta, GA (US)

(72) Inventors: John Mulligan, Brick, NJ (US); Han Q. Nguyen, Marlboro, NJ (US); Samir Saad, Ocean, NJ (US); Jacobus Van Der Merwe, New Providence, NJ (US); Simon Zelingher, Morganville, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 734 days.

This patent is subject to a terminal disclaimer.

(21) Appl. No.: 13/673,341

(22) Filed: Nov. 9, 2012

(65) Prior Publication Data

US 2013/0077470 A1    Mar. 28, 2013

Related U.S. Application Data

(63) Continuation of application No. 13/033,694, filed on Feb. 24, 2011, now Pat. No. 8,351,435, which is a continuation of application No. 12/315,351, filed on Dec. 2, 2008, now Pat. No. 7,916,735.

(51) Int. Cl.
| | |
|---|---|
| *H04L 12/751* | (2013.01) |
| *H04L 12/759* | (2013.01) |
| *H04L 12/721* | (2013.01) |
| *H04L 12/24* | (2006.01) |
| *H04L 12/727* | (2013.01) |

(52) U.S. Cl.
CPC ............ *H04L 45/08* (2013.01); *H04L 41/0654* (2013.01); *H04L 45/02* (2013.01); *H04L 45/028* (2013.01); *H04L 45/121* (2013.01); *H04L 45/123* (2013.01)

(58) Field of Classification Search
CPC . H04L 45/121; H04L 41/0654; H04L 45/123; H04L 45/028; H04L 45/08; H04L 45/02
See application file for complete search history.

(56) References Cited

U.S. PATENT DOCUMENTS

| | | | |
|---|---|---|---|
| 5,425,024 | A | 6/1995 | Hummel |
| 5,719,864 | A | 2/1998 | Badger et al. |
| 5,732,080 | A | 3/1998 | Ferguson et al. |
| 5,790,548 | A | 8/1998 | Sistanizadeh et al. |
| 5,872,783 | A | 2/1999 | Chin |
| 5,940,393 | A | 8/1999 | Duree et al. |
| 6,088,443 | A | 7/2000 | Darland et al. |
| 6,130,890 | A * | 10/2000 | Leinwand et al. ............ 370/400 |
| 6,147,994 | A | 11/2000 | Duree et al. |
| 6,246,686 | B1 | 6/2001 | Ha-Duong et al. |
| 6,603,765 | B1 | 8/2003 | Wilford et al. |
| 6,697,873 | B1 | 2/2004 | Yik et al. |
| 6,775,281 | B1 | 8/2004 | Brown |
| 6,788,700 | B1 | 9/2004 | Nakil |
| 6,980,550 | B1 | 12/2005 | Yip et al. |
| 7,075,926 | B2 | 7/2006 | Cathey et al. |

(Continued)

*Primary Examiner* — Dang Ton
*Assistant Examiner* — Mandish Randhawa (57) ABSTRACT

Systems and methods are described that manage routing information in an IP network using extensible indexing and use the indexing to control the network. The indexing and associated controls apply to any router within the routing domain.

20 Claims, 5 Drawing Sheets

(56) References Cited

U.S. PATENT DOCUMENTS

| | | |
|---|---|---|
| 7,092,389 B2 | 8/2006 | Chase et al. |
| 7,120,150 B2 | 10/2006 | Chase et al. |
| 7,130,393 B2 | 10/2006 | Hall, Jr. et al. |
| 7,313,605 B2 | 12/2007 | Hoglu et al. |
| 7,359,383 B2 | 4/2008 | Wakumoto et al. |
| 7,415,047 B1 | 8/2008 | Levent-Levi et al. |
| 7,447,151 B2 | 11/2008 | McDysan |
| 7,467,227 B1 | 12/2008 | Nguyen et al. |
| 7,515,588 B2 | 4/2009 | Naik et al. |
| 7,567,571 B2 | 7/2009 | Wybenga et al. |
| 7,684,402 B2 | 3/2010 | Chien et al. |
| 7,693,149 B2 | 4/2010 | Cathey et al. |
| 7,706,401 B2 | 4/2010 | Bae et al. |
| 7,715,384 B2 | 5/2010 | Kalkunte et al. |
| 7,769,006 B1 | 8/2010 | Chase et al. |
| 7,881,302 B2 | 2/2011 | Lee et al. |
| 7,889,741 B1 | 2/2011 | Panwar et al. |
| 7,913,294 B1 | 3/2011 | Maufer et al. |
| 7,916,735 B2 | 3/2011 | Mulligan et al. |
| 7,920,549 B2 | 4/2011 | Alt et al. |
| 7,924,757 B2 | 4/2011 | Yiu |
| 7,979,671 B2 | 7/2011 | Aviles |
| 7,983,254 B2 | 7/2011 | Alt et al. |
| 8,040,896 B2 | 10/2011 | Nguyen et al. |
| 8,081,631 B1 | 12/2011 | Chase et al. |
| 8,089,871 B2 | 1/2012 | Hoglu et al. |
| 8,169,915 B1 | 5/2012 | Rangavajjhala et al. |
| 8,184,641 B2 | 5/2012 | Alt et al. |
| 8,195,184 B2 | 6/2012 | Kent et al. |
| 8,325,706 B2 | 12/2012 | Pacella |
| 8,351,435 B2 | 1/2013 | Mulligan et al. |
| 8,396,034 B2 | 3/2013 | Choi et al. |
| 8,407,323 B2 | 3/2013 | Flavel et al. |
| 8,411,667 B2 | 4/2013 | Scholl et al. |
| 8,417,938 B1 | 4/2013 | Considine et al. |
| 8,484,355 B1 | 7/2013 | Lochhead et al. |
| 8,537,854 B2 | 9/2013 | Bae et al. |
| 8,571,011 B2 | 10/2013 | Alt et al. |
| 8,588,121 B2 | 11/2013 | Yin |
| 8,599,853 B2 | 12/2013 | Chidambaram |
| 8,601,091 B2 | 12/2013 | Venouss |
| 8,660,005 B2 | 2/2014 | Roitshtein et al. |
| 8,670,446 B2 | 3/2014 | Chase et al. |
| 8,695,059 B2 | 4/2014 | Kopti |
| 8,699,499 B2 | 4/2014 | Mulligan et al. |
| 8,713,628 B2 | 4/2014 | Kopti |
| 8,761,790 B2 | 6/2014 | Kent et al. |
| 8,776,256 B2 | 7/2014 | Nguyen et al. |
| 8,806,606 B2 | 8/2014 | Ahmad et al. |
| 8,819,195 B2 | 8/2014 | Flavel et al. |
| 8,819,284 B2 | 8/2014 | Nguyen et al. |
| 8,855,121 B2 | 10/2014 | Brown |
| 2005/0180416 A1 | 8/2005 | Jayawardena et al. |
| 2005/0213582 A1 | 9/2005 | Wakumoto et al. |
| 2006/0002393 A1 | 1/2006 | Lappin, Jr. et al. |
| 2006/0028991 A1* | 2/2006 | Tan et al. ............. 370/237 |
| 2006/0029035 A1 | 2/2006 | Chase et al. |
| 2006/0198379 A1 | 9/2006 | Cadambi et al. |
| 2006/0206606 A1 | 9/2006 | Hoglu et al. |
| 2007/0011351 A1 | 1/2007 | Bruno et al. |
| 2007/0198739 A1 | 8/2007 | Jennings et al. |
| 2007/0260746 A1 | 11/2007 | Mirtorabi et al. |
| 2008/0052394 A1 | 2/2008 | Bugenhagen et al. |
| 2008/0062891 A1 | 3/2008 | Van der Merwe et al. |
| 2008/0065783 A1 | 3/2008 | Hoglu et al. |
| 2008/0112401 A1 | 5/2008 | Brown |
| 2008/0183847 A1 | 7/2008 | Kontothanassis et al. |
| 2008/0285445 A1 | 11/2008 | Riddle et al. |
| 2009/0185567 A1 | 7/2009 | Lee et al. |
| 2009/0323681 A1* | 12/2009 | Ventakaramaiah et al. .. 370/389 |
| 2010/0054241 A1* | 3/2010 | Shah et al. ............. 370/389 |
| 2010/0142536 A1 | 6/2010 | Kalkunte et al. |
| 2010/0183014 A1 | 7/2010 | Shua |
| 2011/0249676 A1 | 10/2011 | Singh et al. |
| 2011/0255544 A1 | 10/2011 | Chidambaram |
| 2011/0264822 A1* | 10/2011 | Ferguson ............ H04L 45/00 709/235 |
| 2012/0317235 A1 | 12/2012 | Nguyen et al. |
| 2013/0054426 A1 | 2/2013 | Rowland et al. |
| 2013/0182710 A1 | 7/2013 | Scholl et al. |
| 2013/0227672 A1 | 8/2013 | Ogg et al. |
| 2013/0276090 A1 | 10/2013 | Kopti |
| 2014/0044132 A1 | 2/2014 | Chase et al. |
| 2014/0181966 A1 | 6/2014 | Carney et al. |
| 2014/0223434 A1 | 8/2014 | Mulligan et al. |
| 2014/0250240 A1 | 9/2014 | Schell et al. |
| 2014/0289813 A1 | 9/2014 | Nguyen et al. |
| 2014/0310603 A1 | 10/2014 | Flavel et al. |

* cited by examiner

METHOD FOR APPLYING MACRO-CONTROLS ONTO IP NETWORKS USING INTELLIGENT ROUTE INDEXING

CROSS REFERENCE TO RELATED APPLICATIONS

This application is continuation of U.S. patent application Ser. No. 13/033,694, entitled "Method for Applying Macro-Controls onto IP Networks using Intelligent Route Indexing," filed on Feb. 24, 2011, which issued on Jan. 8, 2013 as U.S. Pat. No. 8,351,435, the disclosure of which is incorporated herein by reference in its entirety, which is a continuation of U.S. patent application Ser. No. 12/315,351, entitled "Method for Applying Macro-Controls onto IP Networks using Intelligent Route Indexing," filed on Dec. 2, 2008, which issued on Mar. 29, 2011 as U.S. Pat. No. 7,916,735, the disclosure of which is incorporated herein by reference in its entirety.

BACKGROUND OF THE INVENTION

The invention relates generally to network engineering. More specifically, the invention relates to systems and methods that manage routing information in an IP network using extensible indexing to control the network.

Historically, Internet Protocol (IP) networks managed routes at an aggregate level or at very large subnetworks and could only apply broad-gauge network controls. Today, IP networks operate in data and control planes.

The data plane is the path which IP packets follow as they traverse an IP network. This includes routers and links between routers which carry data traffic. The data plane is organized around paths which are established with the goal of sending a data packet out of any given router on a path that will take it toward the interface(s) that are associated with the destination address of that packet. At any point in time, an IP network's data plane has an understanding of where to forward any packet it receives based primarily on the destination address of that packet.

The control plane is used to exchange routing messages. The routing messages enable the data plane to organize itself in an optimal manner. The control plane allows the data plane to be organized around paths which carry packets from a source to a destination. These paths are composed of numerous forwarding decisions made at each router based on routing messages received from the control plane.

Routers typically contain input ports, output ports, a specialized operating system, memory, and one or more processors. Distributed routers require memory for two purposes besides the operating system itself: storing a routing table which is used to perform routing decisions and program a forwarding table, and storing the forwarding table which is used when making forwarding decisions to forward packets out on particular interfaces. These two functions are critical to the operation of any router employed on an IP network.

For a network router to have complete routing information, every router would have to couple their control plane to every other router (peer with other routers). This is impracticable but in very small networks. This is due to the scalability limits of routers. To compensate, most IP networks use Route Reflectors (RRs) to manage the size of the control plane.

Figure 1:
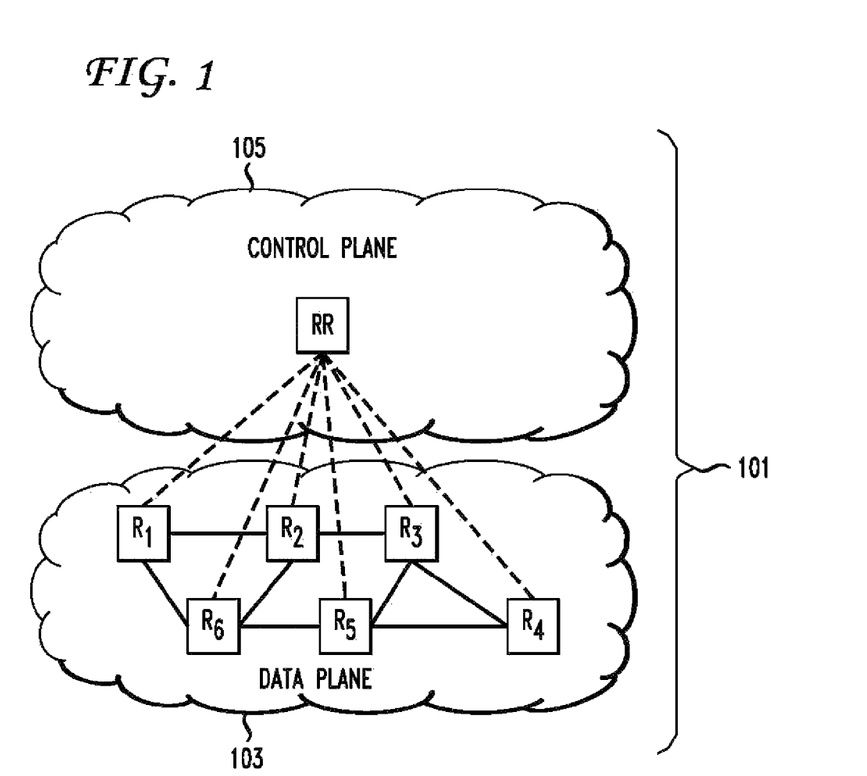
FIG. 1 is an exemplary network showing data and control planes.

Route reflectors are routers which are dedicated to route exchange only, i.e., they do not pass any customer data packets. Route reflectors operate in the control plane. The route reflectors learn routes by exchanging routing messages from router to router which become route reflector clients. Route reflectors peer with all of the routers in a defined network domain so each has reachability within that defined domain and act as the only gateway for routing information exchange between network domains. FIG. 1 shows a network 101 having data links (solid lines) in the data plane 103 coupling routers $R_1$, $R_2$, $R_3$, $R_4$, $R_5$, $R_6$ (collectively R) and control messages (broken lines) between the routers R and a route reflector RR in the control plane 105. In this network scheme all routing decisions are made based upon route updates exchanged using the route reflector RR.

The challenge for network operators is to improve routing efficiency. In order to achieve this, a system and method is needed that allows for the dynamic management of routes by applying network controls to subnets based on dynamic network conditions.

SUMMARY OF THE INVENTION

The inventors have discovered that it would be desirable to have systems and methods that manage routing information in an IP network using extensible indexing, and to leverage this indexing to control the associated IP network. The indexing and associated controls apply to any router within the routing domain.

One aspect of the invention provides a method for managing route information in an IP network. The operations of the method may be performed by a processor. Methods according to this aspect of the invention include storing route information from the IP network in a data store, for a plurality of network routes; associating with each network route an index having at least five alpha-numeric index fields containing information from the data store, including index fields representing each one of a network route source geographic location, a network route destination geographic location, a network route priority, whether the network route has an alternate path and whether an application associated with the network route is delay tolerant; acquiring one or more network operating conditions from the IP network; and, based on the one or more network operating conditions, executing a predetermined control action modifying a plurality of the network routes having one or more matching index fields.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of alternative software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that manage routing information in an IP network using extensible indexing and use the indexing to control the IP network. The invention may be implemented as a modular framework and deployed as software as an application program tangibly embodied on a program storage device. The application code for execution can reside on a plurality of different types of computer readable media known to those skilled in the art.

FIG. 1 shows a typical network 101 that is comprised of a plurality of routers R, including a network ingress (Provider Edge (PE)) router $R_1$, an egress (PE) router $R_4$ and network forwarding (Provider (P)) routers $R_2$, $R_3$, $R_5$, $R_6$ depending on the size of the network 101. P routers are strictly interior routers and do not terminate any external connections. Many P routers may be accessed between two PE routers. For example, traffic may enter a PE router in San Diego, Calif., and need to egress on a PE router in Boston, Mass., and traverse a route via a plurality of P routers from San Diego to Los Angeles to Chicago to New York to Boston. The network 101 provides connectivity between a source network and destination network.

A router is an electronic device and/or software that connect at least two networks, such as two Local Area Networks (LANs) or Wide Area Networks (WANs), and forwards packets between them. Each packet can traverse many routers, making many hops throughout the Internet as well as multiple routers within a large organization.

A next hop is the next router to which a packet is sent from any given router as it traverses a network from its source to its destination. In the event that the packet is at the final router in its journey, the next hop is the final destination. A hop is the trip that a packet takes from one router to another or from the final router to the destination. A packet, also referred to as a datagram, is a fundamental unit of data transmission on the Internet and other Transmission Control Protocol/Internet Protocol (TCP/IP) networks.

Routers forward data packets between networks using headers and forwarding tables to determine the best path to forward the packets. Routers work at the network layer of the TCP/IP model or Layer 3 of the Open Systems Interconnection (OSI) model. Routers also provide interconnectivity between like and unlike media. This is accomplished by examining the header of a data packet, and making a decision on the next hop to which it should be sent. Routers use preconfigured static routes, status of their hardware interfaces, and routing protocols to select the best route between any two subnets.

The next hop for any particular packet at any particular point in its journey is determined, for example, in the Internet by both the IP address of its destination as contained in its header and the routing table in the router at that point. An IP address is a unique numeric identifier for each computer or router on a TCP/IP network. A routing table is a database in a router that stores and frequently updates the IP addresses of reachable networks, called "routes" or "prefixes," and the most efficient path to them.

The route announcement allows a router to learn the routing information to properly forward subsequently received packets to the same destination. Embodiments configure a complete network by analyzing new or pre-existing network architectures. Each network element may then be configured according to their operating system.

Figure 2:
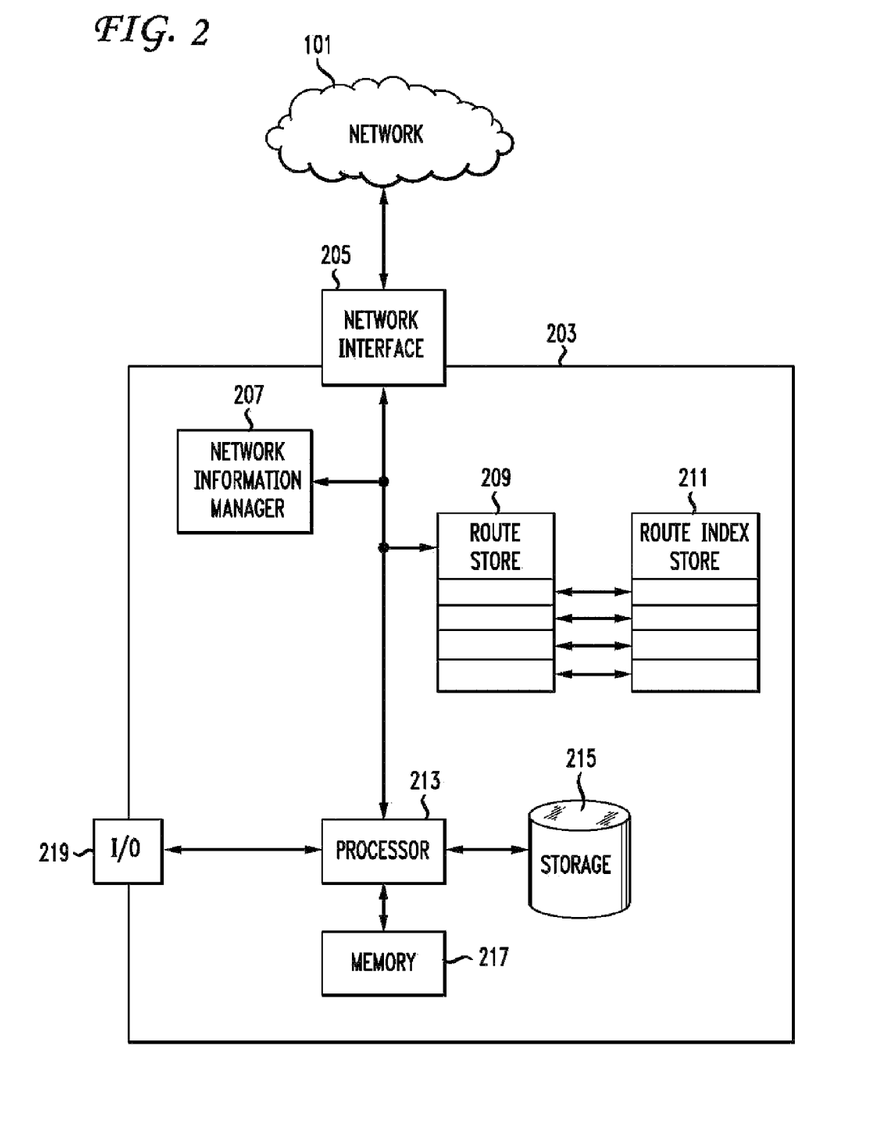
FIG. 2 is an exemplary system framework.
Figure 3:
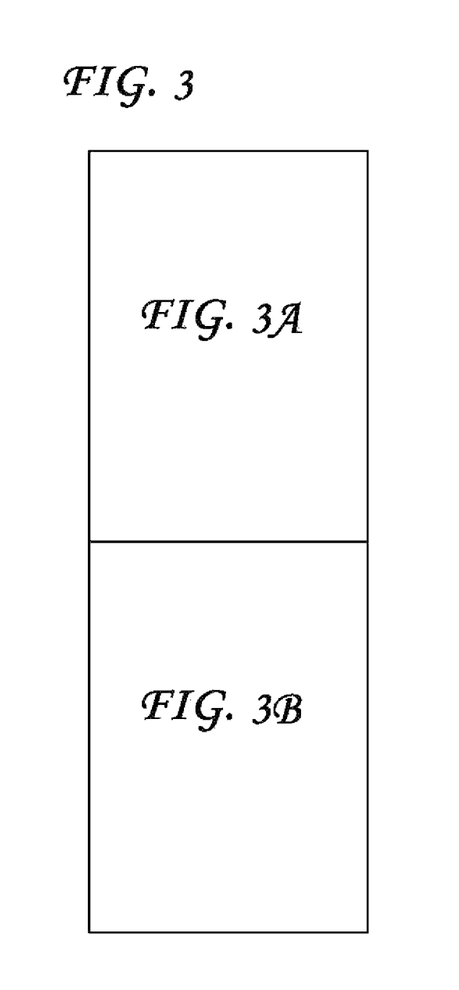
FIGS. 3, 3A and 3B show an exemplary method.
Figure 3A:
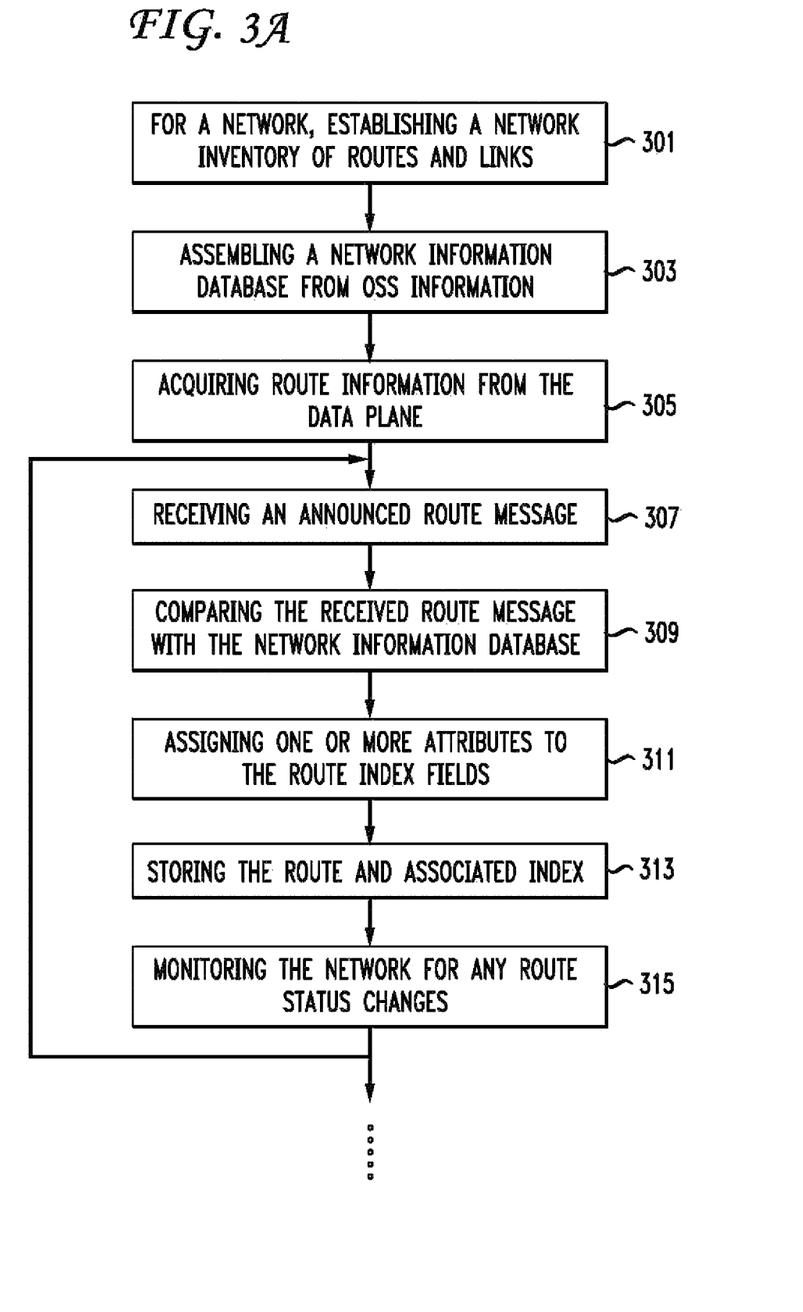
Figure 3B:
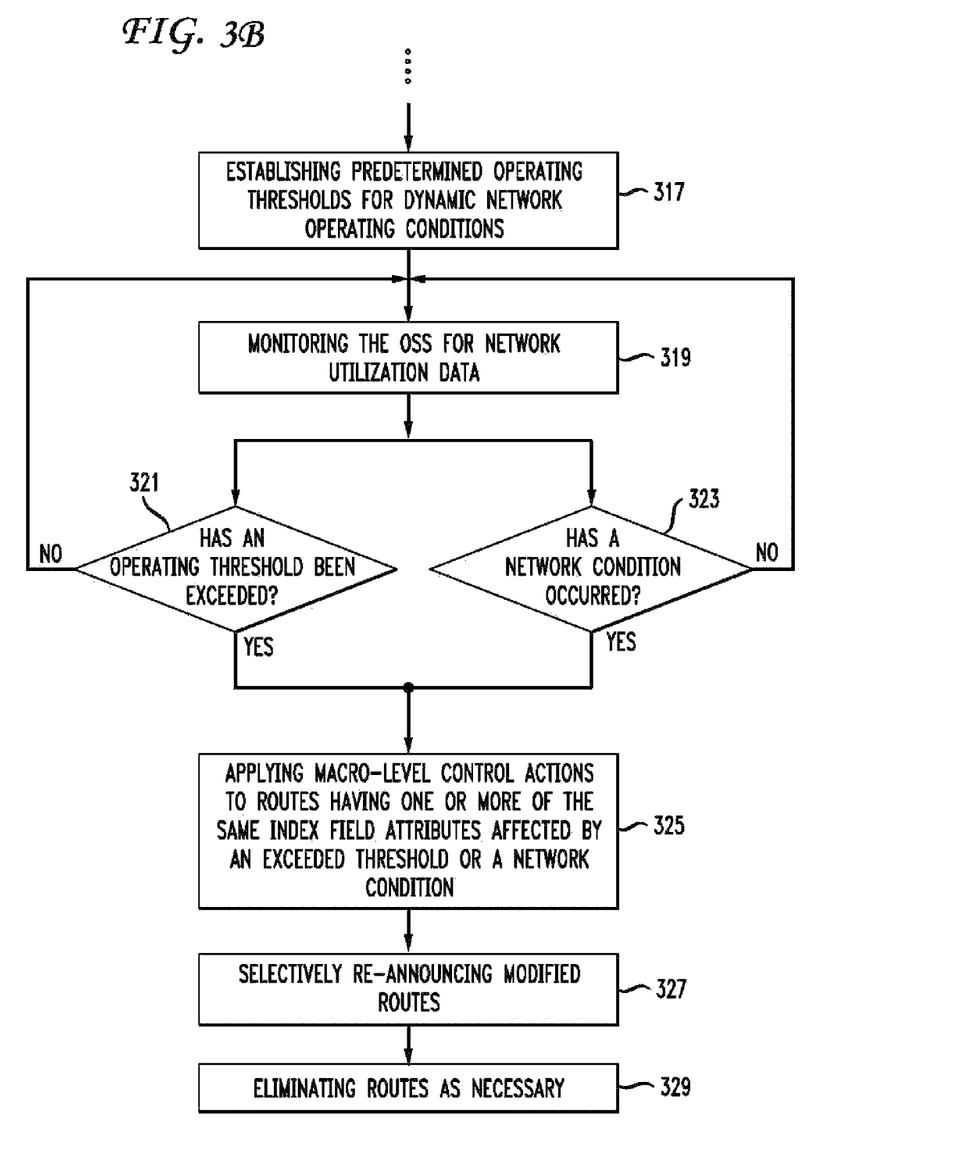

FIG. 2 shows an embodiment of a system framework 203 and FIG. 3 shows a method. The framework 203 which may be part of a network management server includes a network interface 205 coupled to a network 101 and configured to acquire network topology information, network reachability information, as well as network status information to perform network management services. The network interface 205 is coupled to a network information manager 207, a route store 209, a route index store 211 and a processor 213. The processor 213 is coupled to storage 215, memory 217 and I/O 219.

The framework 203 stores acquired network data into a data store 215. The framework 203 may be implemented as a computer including a processor 213, memory 217, storage devices 215, software and other components. The processor 213 is coupled to the network interface 205, I/O 219, storage 215 and memory 217 and controls the overall operation of the computer by executing instructions defining the configuration. The instructions may be stored in the storage device 215, for example, a magnetic disk, and loaded into the memory 217 when executing the configuration. Embodiments may be implemented as an application defined by the computer program instructions stored in the memory 217 and/or storage 215 and controlled by the processor 213 executing the computer program instructions. The computer also includes at least one network interface 205 coupled to and communicating with a network 101 such as shown in FIG. 1 to interrogate and receive network configuration data. The I/O 219 allows for user interaction with the computer via peripheral devices such as a display, a keyboard, a pointing device, and others.

Embodiments provide a system and method that index routes exchanged within an IP network. One or more values are assigned to fields of a multi-value index for every route to capture network/service route attributes associated with that route. Each route 209 and its associated index 211 are stored in the framework 203. For each route, macro-level controls may be applied based on a variety of network events. Examples of macro controls include traffic load shedding (removing a route which in turn removes the associated traffic load from the network), traffic redirection (changing a route and redirecting the associated traffic over an alternate path to its destination) and traffic shaping (changing a route and redirecting it into a path/device which limits the amount of bandwidth that can be consumed). Network events may be applied to each route to determine how the route should be changed and redistributed back to the routers in the network 101. Changes to the routes before they are redistributed include replacing a route with a "black hole" route (a pre-established route that drops traffic rather than forwards it to its destination), replacing a route with a route to an alternate path to its destination, or replacing a route with a route through a choke control/rate limiting network peripheral that can limit traffic volume. These modified routes represent examples of the macro-level control that embodiments employ.

Although these controls are macro in nature when viewed from the perspective of overall impact, embodiments enable these controls to be applied surgically on selected routers within the network 101. That is, the composition of the set of routers upon which the controls are applied can be highly selective and customized based on various network/service route attributes encoded in the route index fields of a given route. For example, one route index field may identify routes distributed to gateway routers to the public Internet. In response to an increase in denial of service traffic toward a particular address, the macro control may be to black hole all traffic toward this address that enters from these Internet gateway routers, thereby blocking traffic from off-network sources while allowing on-network traffic toward that address to flow. Additional network events that trigger these controls may include simple auditing, localized high traffic volumes, network outages, and various other network conditions that require mitigation.

Embodiments provide an index that is applied to all routes in a defined IP network as they are learned. As a route is learned via routing protocols such as Border Gateway Protocol (BGP) and Open Shortest Path First (OSPF), it is stored 209 along with an associated index 211. The index is derived upon learning the route by consulting stored information associated with the network. The associated information includes a customer subscription, application information associated with the access line from where a route is announced from, the place in the network topology where a route is announced from, and others.

The index network/service route attributes capture the service/network context of a route. Routes are more than a path to an interface that is reachable from a given router. The router that a route originates from has context associated with where in the network topology it is being announced from (a PE router vs. a gateway router vs. a P router). The specific service interface that a route is associated with has service context. It may be carrying special traffic associated, for example, with Government Emergency Telecommunications Service (GETS) which takes priority over other services in times of emergency. It may be carrying traffic which is delay tolerant. This network/service context can be derived by consulting stored information when the route is received. The route index fields are intended to capture this context so that later, if network events occur, macro-level controls may be applied based on each route's index.

The associated network information may be applied to each learned route. Route index fields may include whether the route is associated with a simplex or duplex path, whether data traffic associated with the route is Quality of Service (QoS) tolerant (delay, packet loss or jitter), specialized handling for source/destination pairs, the service type associated with the access line the route is coming from, the domain of the route (inter-network, network-wide or regional), a default value of the route and whether customer initiated route updates are allowed. Using a route's index, the framework 203 can implement macro-level network control based on external network conditions or events (triggers). The external triggers may include time of day, network capacity levels, network failures (planned and unplanned) and feedback mechanisms from customers (loading on their networks and/or servers hosting key applications).

The macro-level controls can be made customer-specific so that new services can be built upon this control methodology resulting in new revenue from existing IP customers. These controls can also be based on a wide variety of network conditions so that the associated IP network can dynamically adapt to a wide range of network conditions. This enables a closed-loop feedback mechanism so that network performance, for example, can be used to inform routing decisions.

Embodiments leverage network visibility into routing information to capture all of the routes associated with a network by employing two stages which are associated with the direction of information flow between the data and control planes. The first stage is route indexing which acquires the routing information that is announced into the control plane by the routers in the network 101 via standard routing protocols (BGP and OSPF) and associates one or more network/service route attributes to fields in each index based on stored network information. The second stage is intelligent macro-level control. Indexing takes advantage of the control plane messaging in the return direction from the framework 203 back to the routers in the network 101.

The framework 203 has full route visibility, acquiring routes received by route reflectors RRs (and/or via an embedded RR function within the framework 203) from network routers R and routes sent from route reflectors RRs to the network routers R, and assembles a network information database from information supplied from Operations Support Systems (OSSs) employed in the network (steps 301, 303, 305). The framework 203 receives each announced route message and compares it to the stored information (steps 307, 309). This comparison is used to derive the network and service context associated with a route so that appropriate network/service route attributes can be entered in the route's index fields.

The comparison results in assigning one or more network/service route attributes to applicable route index fields (step 311). Both the route 209 and index 211 are stored (step 313).

The route index may be an alpha-numeric tag which classifies a route relative to a number of network/service route attributes entered in the index fields. Network/service route attributes comprise the route source geographic location such as the eastern region, central region, mountain region or western region of the US (E, C, M or W), the route destination geographic location interface associated with the route (E, C, M or W), the route priority such as if it is affiliated with GETS or standard Internet services (G or I), whether the route has an alternate path or if it is associated with a single path for forwarding to its destination (A or S), and whether an application associated with the route is delay intolerant such as Voice over IP (VoIP) or delay tolerant such as traditional IP traffic (Sensitive to delay (S) or Tolerant of delay (T)). Other variables may be employed for other network/service route attributes.

For example, one route may have index fields E/E/G/S/S to indicate that its source is the eastern region, its destination the eastern region, it is associated with GETS, it is the only single path to this destination and it is associated with a delay intolerant application. Embodiments allow for the development of specific index network/service route attributes for each route that the framework 203 can observe and stores all routes and indices. Since the indexing stage is part of the framework 203, it may be extended with new index fields with no impact on the underlying network routers R. Indexing is a real-time application and creates a new index for new routes as they are announced from the data plane. The indices for existing routes are updated if their status changes (step 315).

The intelligent control stage monitors both the network 101 and associated OSSs that are responsible for managing the network 101. These sources provide information including any outages that may exist in the network, capacity consumption levels for each of the nodes/links in the network and any pending changes that are about to be made to the network (Planned Maintenance (PM) activities that may take a router or link out of service in order to perform an upgrade). Intelligent control monitors network conditions, including utilization data to detect when different parts of the underlying IP network may be experiencing severe and/or sustained congestion which is resulting in significant packet loss in a localized part of the network. By monitoring the network 101 and associated management systems, predefined operating thresholds serve as setpoints that initiate predetermined functions into action (step 317). If an operating threshold is exceeded (steps 319, 321, 323), macro controls may be executed on the network by applying common actions to routes having the same network/service route attribute in like route index fields (step 325).

A common action may be to shed network load by eliminating all routes of a given type. For example, all routes with destinations in the Eastern Region (E), but not associated with GETS and not associated with delay sensitive applications. This may be performed by selectively re-announcing modified routes (step 327) that match the index fields for the common action. Route modification would be to replace the route learned from the network 101 with a black hole route which drops that traffic where it enters the network (at the source). These modified routes would be announced into the data plane for routes matching the particular index network/service route attribute, while those that do not match will continue to be announced into the data plane in their unmodified state. In this manner, an entire class of traffic may be removed from the network at a macro level, while preserving other important routes in the same area (step 329).

Since in a typical IP network the overall volume of routes that are dealt with may be in the range of tens of thousands to millions, the indexing stage in conjunction with the intelligent control stage provide an effective means of executing control onto IP networks which were previously considered infeasible.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for managing route information in an IP network comprising:
   by a processor, storing in a route store, route information from the IP network for a plurality of network routes;
   by the processor, associating with each network route an index having at least five alpha-numeric index fields containing service context information derived upon learning the route by consulting stored context information about the route, the alpha-numeric index fields including index fields representing each one of a network route source geographic location, a network route destination geographic location, a network route priority, whether the network route has an alternate path and whether an application associated with the network route is delay tolerant, the alpha-numeric index fields further including at least one index field containing information derived from an access line and network topology location from which the associated route was announced via a routing protocol;
   for each network route for which route information is stored in the route store, entering, in a route index store, the index associated with the network route;
   by the processor, acquiring one or more network operating conditions from the IP network;
   by the processor, based on the one or more network operating conditions, executing a predetermined control action modifying a plurality of the network routes identified as having one or more matching index fields determined from the indexes stored in the route index store.

2. The method according to claim 1 wherein the network operating conditions comprise dynamic network operating conditions.

3. The method according to claim 2, wherein executing a predetermined control action modifying a plurality of the network routes having one or more matching index fields further comprises:
   associating a predetermined operating threshold for each dynamic network operating condition; and
   if a dynamic network operating condition exceeds its predetermined operating threshold, triggering the predetermined control action.

4. The method according to claim 3 wherein one predetermined operating threshold is time of day.

5. The method according to claim 3 wherein one predetermined operating threshold is IP network failure.

6. The method according to claim 1 wherein a route index further includes customer subscription information.

7. The method according to claim 1 wherein the route information originates from route reflector messages.

8. The method according to claim 1 wherein one route index field is an alternate route path.

9. The method according to claim 1 further comprising, if the route information indicates a change in status for a route, updating the affected route's index accordingly.

10. The method according to claim 1 wherein the predetermined control action comprises applying a predetermined logic based on the information from the data store.

11. A computer-readable storage device having stored thereon computer readable instructions for managing route information in an IP network, wherein execution of the computer readable instructions by a processor causes the processor to perform operations comprising:
   storing in a data store, route information from the IP network for a plurality of network routes;
   associating with each network route an index having at least five alpha-numeric index fields containing service context information derived upon learning the route by consulting stored context information about the route, the alpha-numeric index fields including index fields representing each one of a network route source geographic location, a network route destination geographic location, a network route priority, whether the network route has an alternate path and whether an application associated with the network route is delay tolerant, the alpha-numeric index fields further including at least one index field containing information derived from an access line and network topology location from which the associated route was announced via a routing protocol;
   for each network route for which route information is stored in the route store, entering, in a route index store, the index associated with the network route;
   acquiring one or more network operating conditions from the IP network;
   based on the one or more network operating conditions, executing a predetermined control action modifying a plurality of the network routes identified as having one or more matching index fields determined from the indexes stored in the route index store.

12. The computer-readable storage device according to claim 11 wherein the network operating conditions comprise dynamic network operating conditions.

13. The computer-readable storage device according to claim 12, wherein executing a predetermined control action modifying a plurality of the network routes having one or more matching index fields further comprises:
    associating a predetermined operating threshold for each dynamic network operating condition; and
    if a dynamic network operating condition exceeds its predetermined operating threshold, triggering the predetermined control action.

14. The computer-readable storage device according to claim 13 wherein one predetermined operating threshold is time of day.

15. The computer-readable storage device according to claim 13 wherein one predetermined operating threshold is IP network failure.

16. The computer-readable storage device according to claim 11 wherein a route index further includes customer subscription information.

17. The computer-readable storage device according to claim 11 wherein the route information originates from route reflector messages.

18. The computer-readable storage device according to claim 11 wherein one route index field is an alternate route path.

19. The computer-readable storage device according to claim 11 further comprising, if the route information indicates a change in status for a route, updating the affected route's index accordingly.

20. The computer-readable storage device according to claim 11 wherein the predetermined control action comprises applying a predetermined logic based on the information from the data store.

* * * * *